US010862407B2

(12) United States Patent
McAlister

(10) Patent No.: US 10,862,407 B2
(45) Date of Patent: Dec. 8, 2020

(54) SELF-SUSTAINED FRICTIONLESS NEAR PERPETUAL MAGLEV GENERATOR AND METHOD FOR OPERATING

(71) Applicant: Ryan Neil McAlister, Canyon Country, CA (US)

(72) Inventor: Ryan Neil McAlister, Canyon Country, CA (US)

(*) Notice: Subject to any disclaimer, the term of this patent is extended or adjusted under 35 U.S.C. 154(b) by 591 days.

(21) Appl. No.: 15/675,600

(22) Filed: Aug. 11, 2017

(65) Prior Publication Data

US 2018/0048248 A1 Feb. 15, 2018

Related U.S. Application Data

(60) Provisional application No. 62/373,716, filed on Aug. 11, 2016.

(51) Int. Cl.
*H02N 15/04* (2006.01)
*H02K 53/00* (2006.01)
*H02N 11/00* (2006.01)

(52) U.S. Cl.
CPC .............. *H02N 15/04* (2013.01); *H02K 53/00* (2013.01); *H02N 11/002* (2013.01); *H02N 11/008* (2013.01)

(58) Field of Classification Search
None
See application file for complete search history.

(56) References Cited

U.S. PATENT DOCUMENTS

| 5,818,137 A | 10/1998 | Nichols et al. |
|---|---|---|
| 2003/0010550 A1 | 1/2003 | Prucher |
| 2008/0150295 A1 | 6/2008 | Fein et al. |
| 2011/0025239 A1 | 2/2011 | Epstein et al. |
| 2012/0091832 A1 | 4/2012 | Soderberg |
| 2015/0115756 A1 | 4/2015 | Walsh |
| 2015/0123505 A1 | 5/2015 | Kalev et al. |

FOREIGN PATENT DOCUMENTS

| CN | 101588116 B | 1/2013 |
|---|---|---|
| CN | 104079144 A | 10/2014 |

*Primary Examiner* — Nguyen Tran
(74) *Attorney, Agent, or Firm* — Plager Schack LLP; Mark H. Plager; Stephen Hallberg

(57) ABSTRACT

A perpetual self-sustained frictionless maglev generator started from an external power or battery source is disclosed. The power from the generator can be remote at each station avoiding vulnerability from terrorist attacks. All automobiles, airplanes, watercraft, and space ships would be self-sustained and not require any fuel unless for emergency backup purposes only. They all can be measured/controlled by GPS on a distance used and charged for that use accordingly on a monthly basis. Nuclear disaster would not be a threat because the government could use this generator to power their apparatus instead.

10 Claims, 16 Drawing Sheets

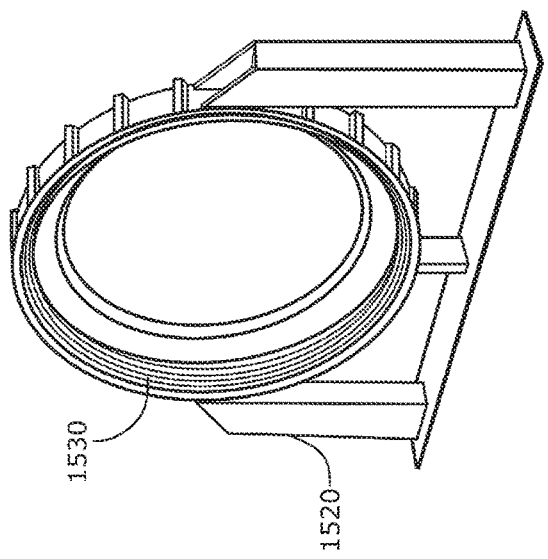
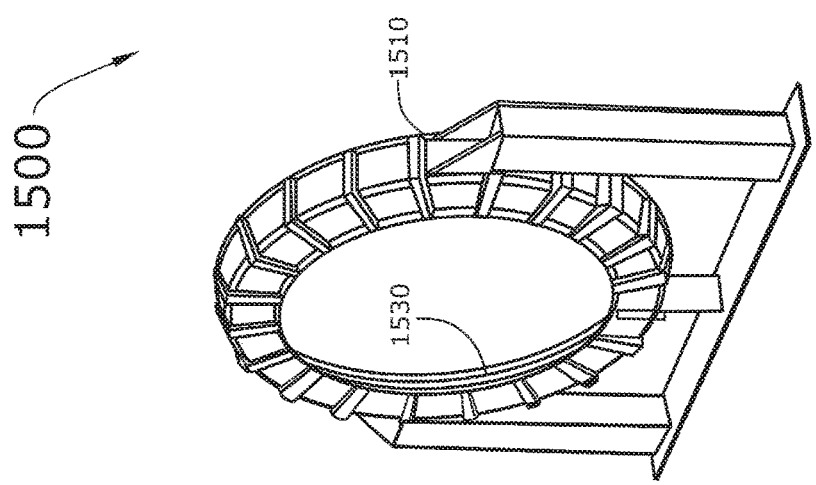
FIG. 15

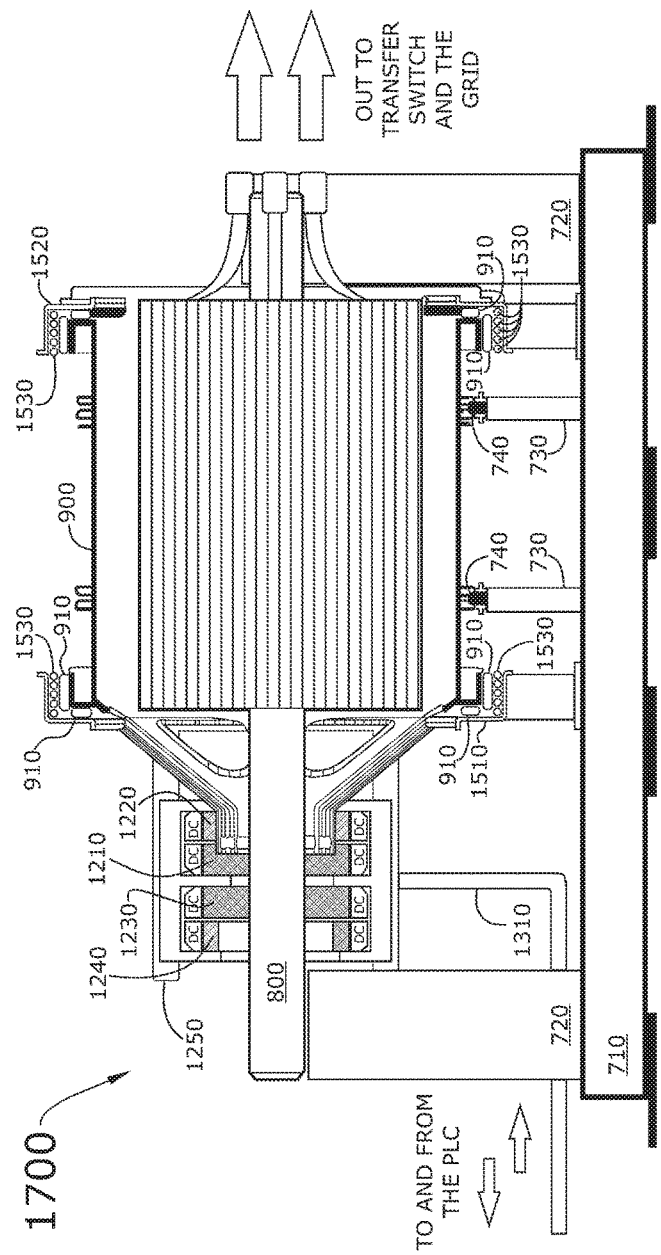
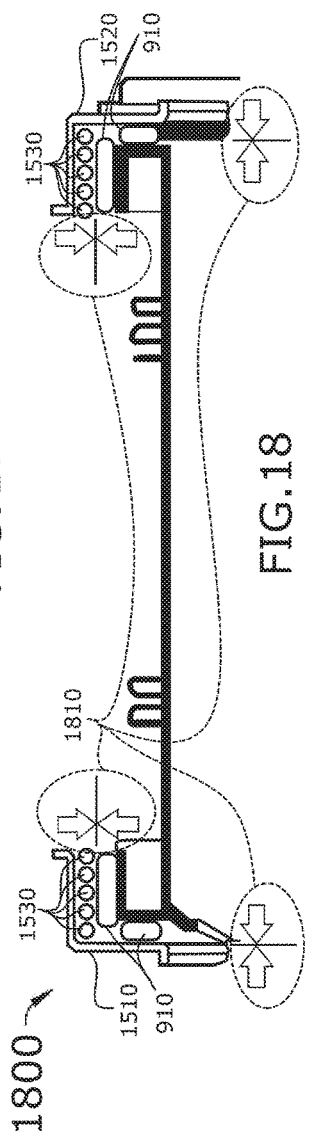
FIG. 17
FIG. 18

SELF-SUSTAINED FRICTIONLESS NEAR PERPETUAL MAGLEV GENERATOR AND METHOD FOR OPERATING

CLAIM OF BENEFIT TO PRIOR APPLICATION

This application claims benefit to U.S. Provisional Patent Application 62/373,716, entitled "PERPETUAL SELF-SUSTAINED FRICTIONLESS MAGLEV GENERATOR STARTED FROM AN EXTERNAL POWER OR BATTERY SOURCE," filed Aug. 11, 2016. The U.S. Provisional Patent Application 62/373,716 is incorporated herein by reference.

BACKGROUND

Embodiments of the invention described in this specification relate generally to power generating systems, and more particularly, to a self-sustained nearly frictionless and near perpetual magnetic levitation generator that is started from an external power or battery source and a method for operating a self-sustained nearly frictionless and near perpetual magnetic levitation generator by starting from an external power or battery source.

Existing power technologies like hydro, solar, wind, fuel, natural gas, nuclear, or any other types of electrical generating means of power are inefficient and not feasible given current power demands (which are growing at a rapid rate). For instance, California alone is short 500 power plants to meet its own power needs. Our renewable energy sources like wind (mechanical maintenance) and solar (longevity of the photovoltaic cells) are not efficient but are getting better as the technology has evolved. All the other technologies are not self-reliant which can leave mankind vulnerable if a problem occurred with the energy we are relying on.

Therefore, what is needed is a power solution that eliminates the need of inefficient old power technologies like hydro, solar, wind, fuel, natural gas, nuclear, or any other types of electrical power generating means and should be remote at each station avoiding vulnerability from terrorist attacks and other dangers, and remote in such a way that all automobiles, airplanes, water craft, and space ships would be self-sustained and not require any fuel unless for emergency purposes only.

BRIEF DESCRIPTION

A novel self-sustained nearly frictionless and near perpetual magnetic levitation (hereinafter referred to as "maglev") generator and a novel method for operating the self-sustained nearly frictionless and near perpetual maglev generator are disclosed. In some embodiments, the self-sustained nearly frictionless and near perpetual maglev generator is started from an external power or battery source.

In some embodiments, the method for operating a self-sustained nearly frictionless and near perpetual maglev generator started from an external power or battery source provides a power solution that eliminates the need of inefficient old power technologies like hydro, solar, wind, fuel, natural gas, nuclear, or any other types of electrical power generating means, and which can be utilized to power automobiles, water crafts, airplanes, space craft, weapons, and a variety of other power-needy machines.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Figure 1:
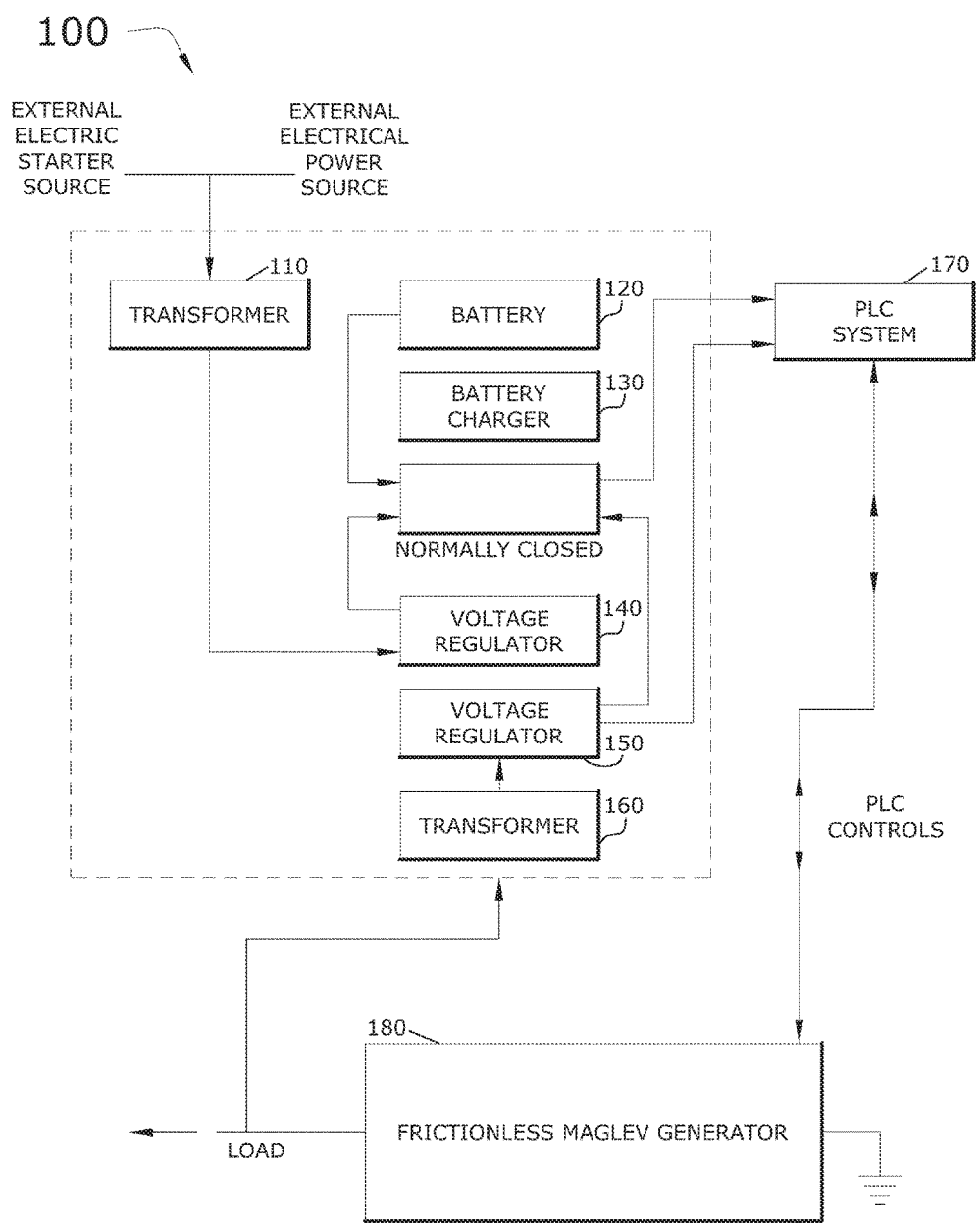

Having thus described the invention in general terms, reference is now made to the accompanying drawings, which are not necessarily drawn to scale, and which show different views of different example embodiments, and wherein:

FIG. 1 conceptually illustrates a signal and current line diagram of a self-sustained nearly frictionless and near perpetual maglev generator in some embodiments.

Figure 2:
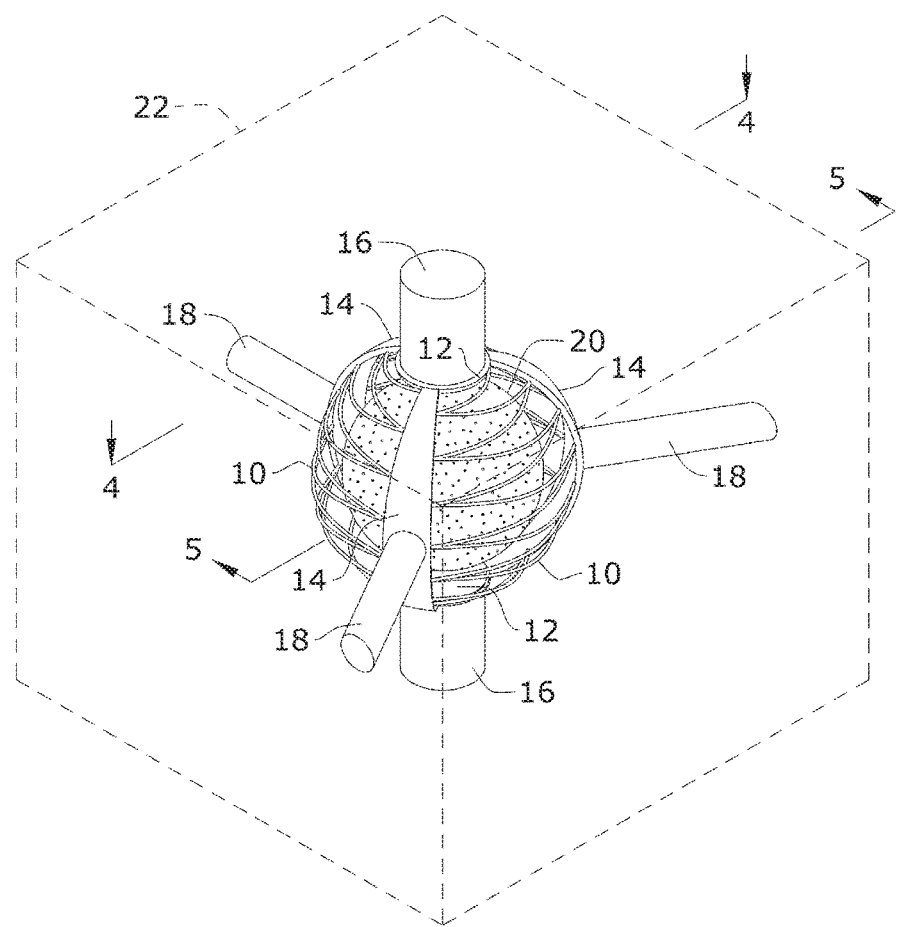

FIG. 2 conceptually illustrates an example of a self-sustained nearly frictionless and near perpetual maglev generator in some embodiments.

Figure 3:
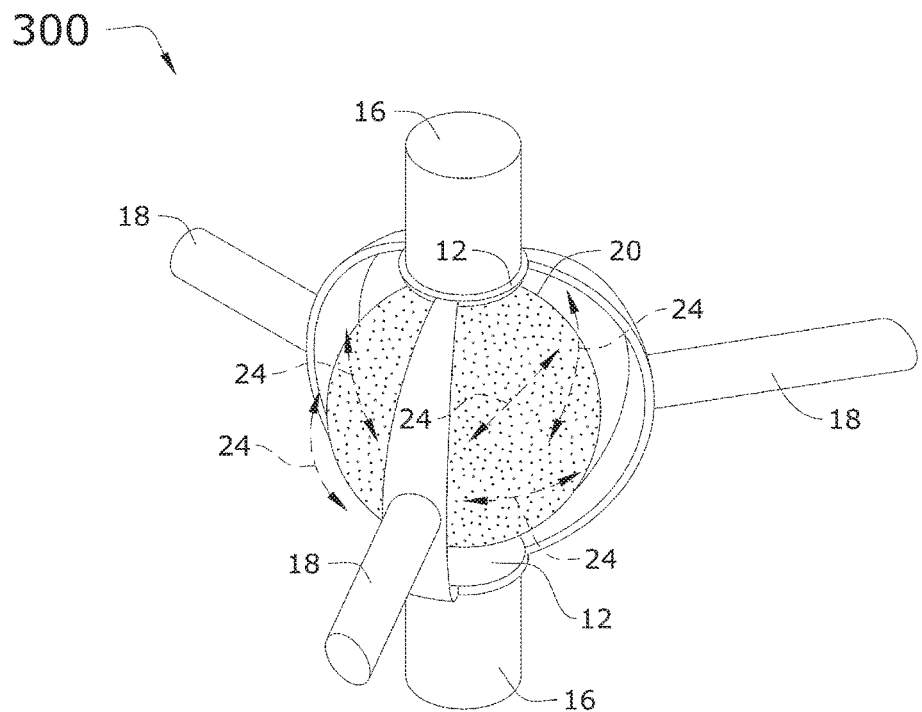

FIG. 3 conceptually illustrates an example of an operating self-sustained nearly frictionless and near perpetual maglev generator without the enclosure and the stationary EMF coils for clarity.

Figure 4:
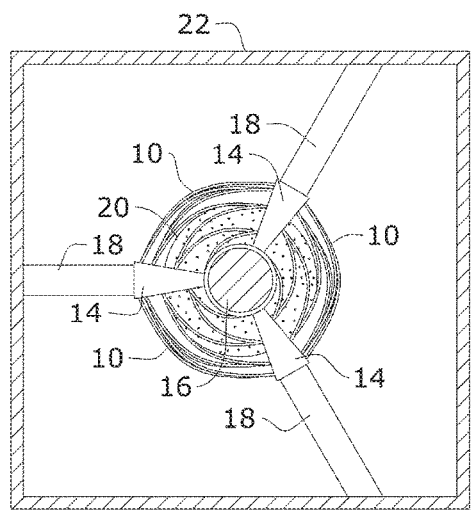

FIG. 4 conceptually illustrates a section view of the self-sustained nearly frictionless and near perpetual maglev generator taken along 4-4 in FIG. 2.

Figure 5:
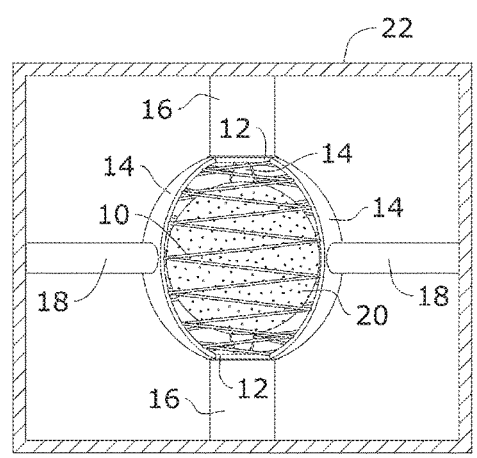

FIG. 5 conceptually illustrates a section view of the self-sustained nearly frictionless and near perpetual maglev generator taken along 5-5 in FIG. 2.

Figure 6:
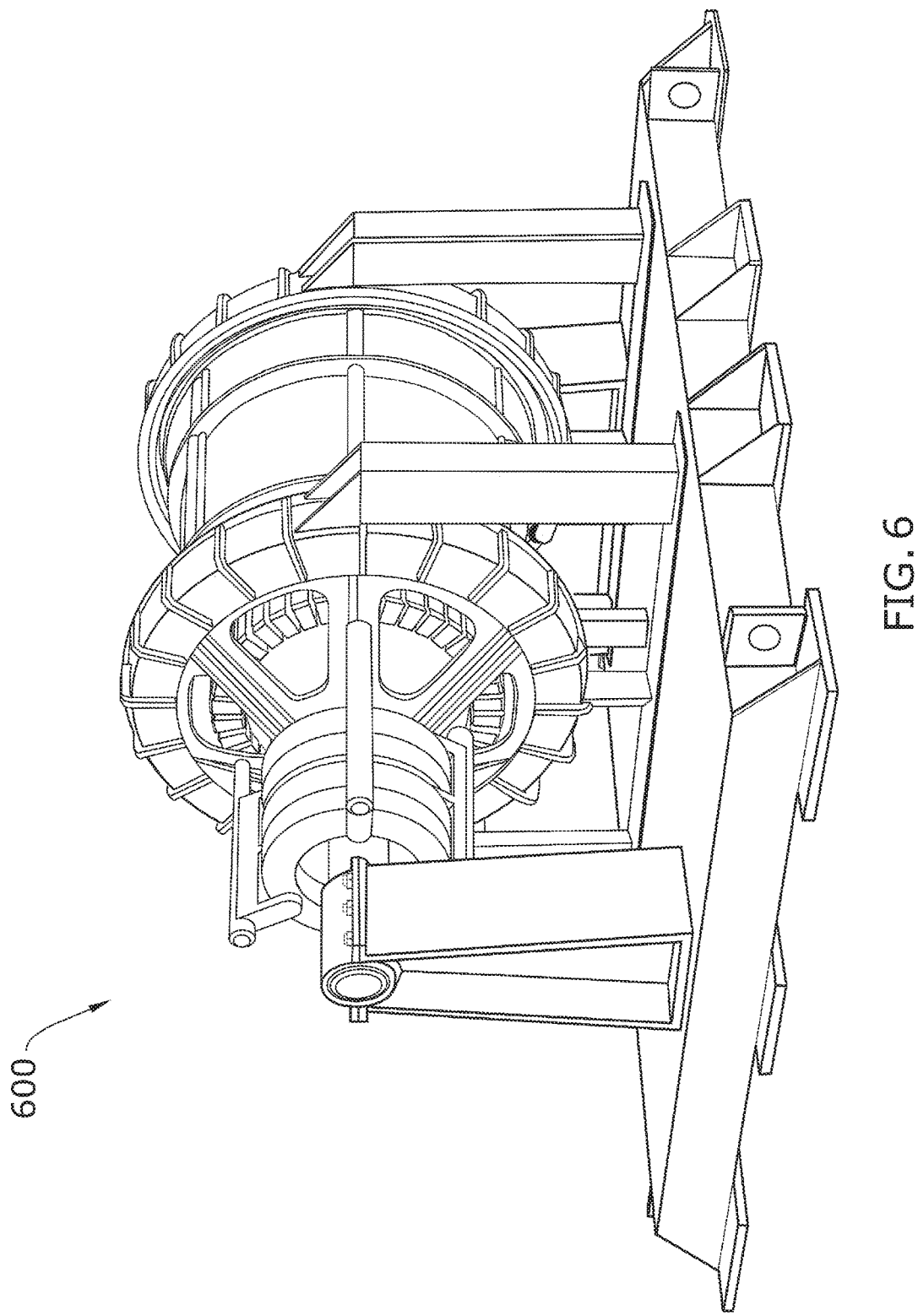

FIG. 6 conceptually illustrates a self-sustained nearly frictionless and near perpetual maglev generator in some embodiments.

Figure 7:
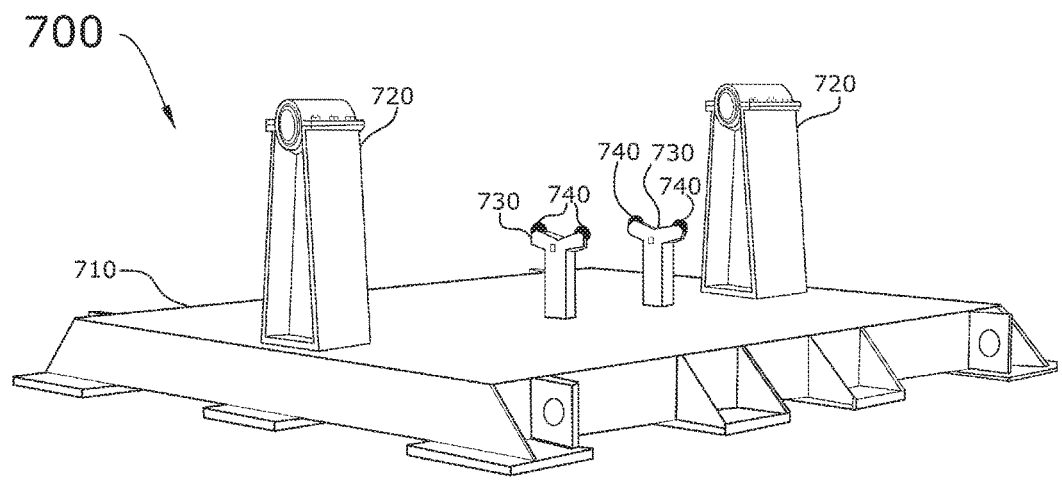

FIG. 7 conceptually illustrates a base with stator and rotor supports in some embodiments.

Figure 8:
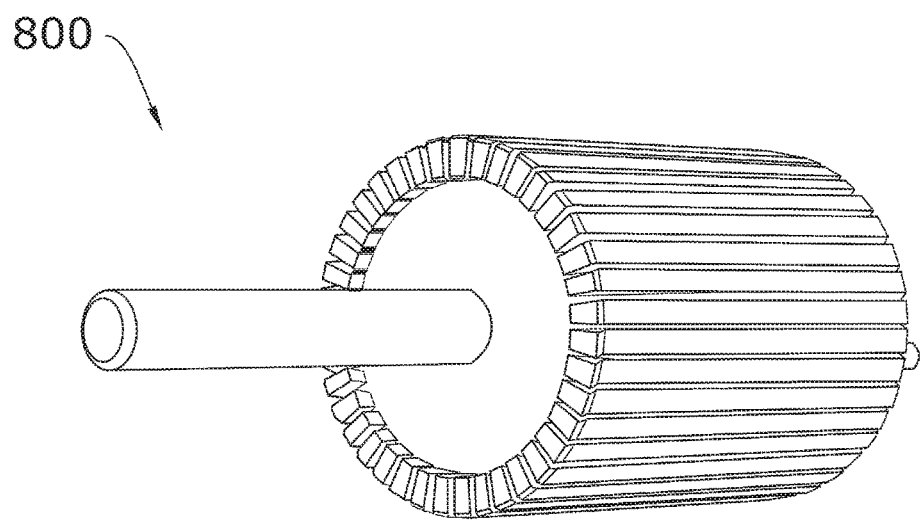

FIG. 8 conceptually illustrates a stator in some embodiments.

Figure 9:
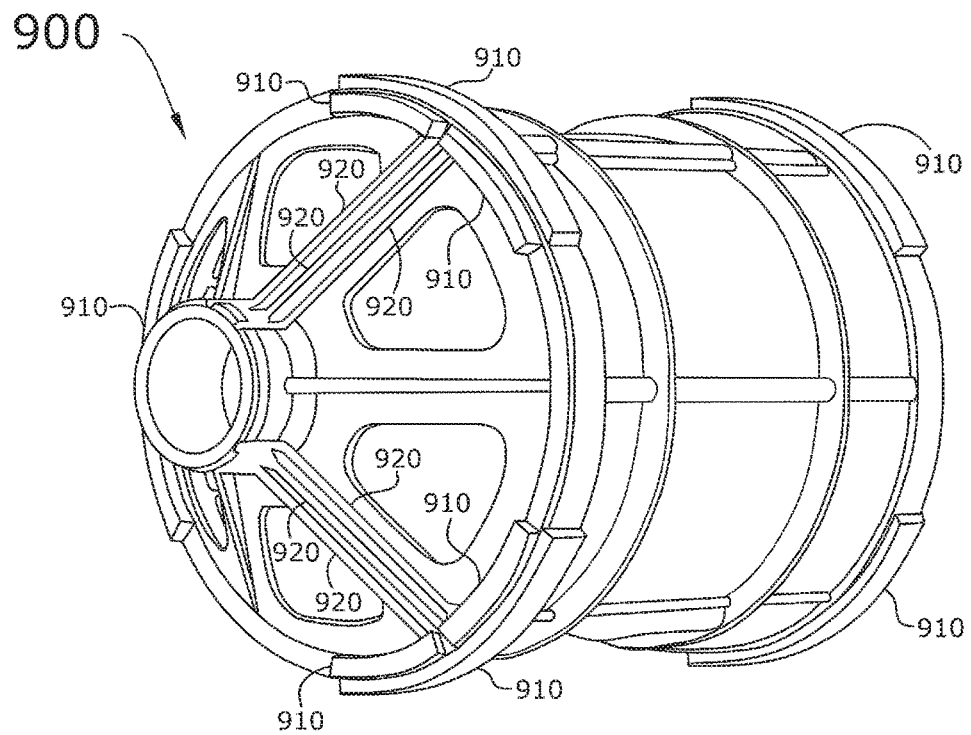

FIG. 9 conceptually illustrates a rotor in some embodiments.

Figure 10:
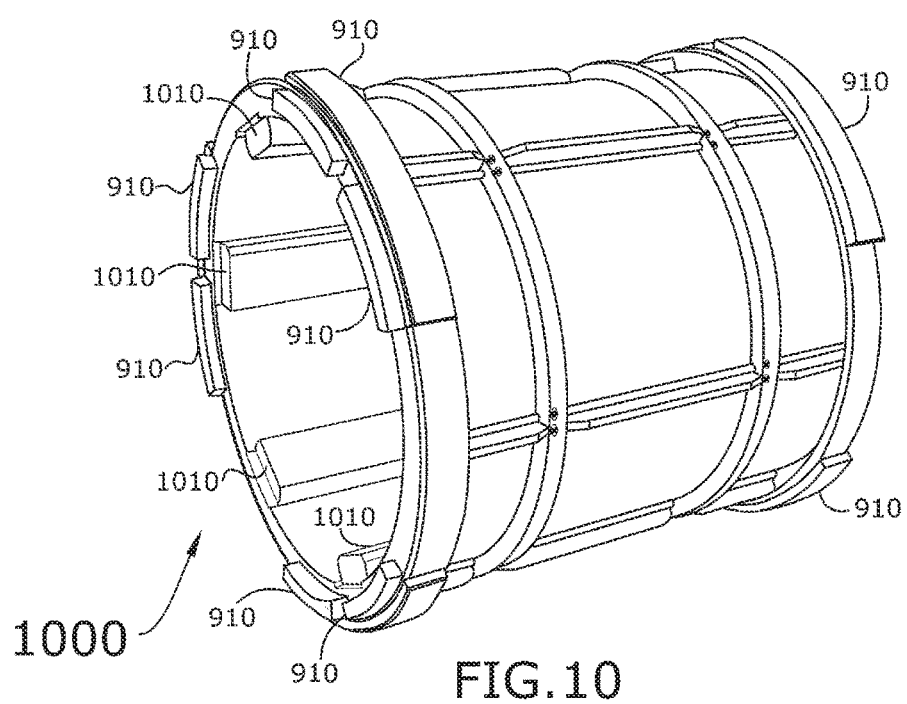

FIG. 10 conceptually illustrates magnets that align an inner surface of the rotor in some embodiments.

Figure 11:
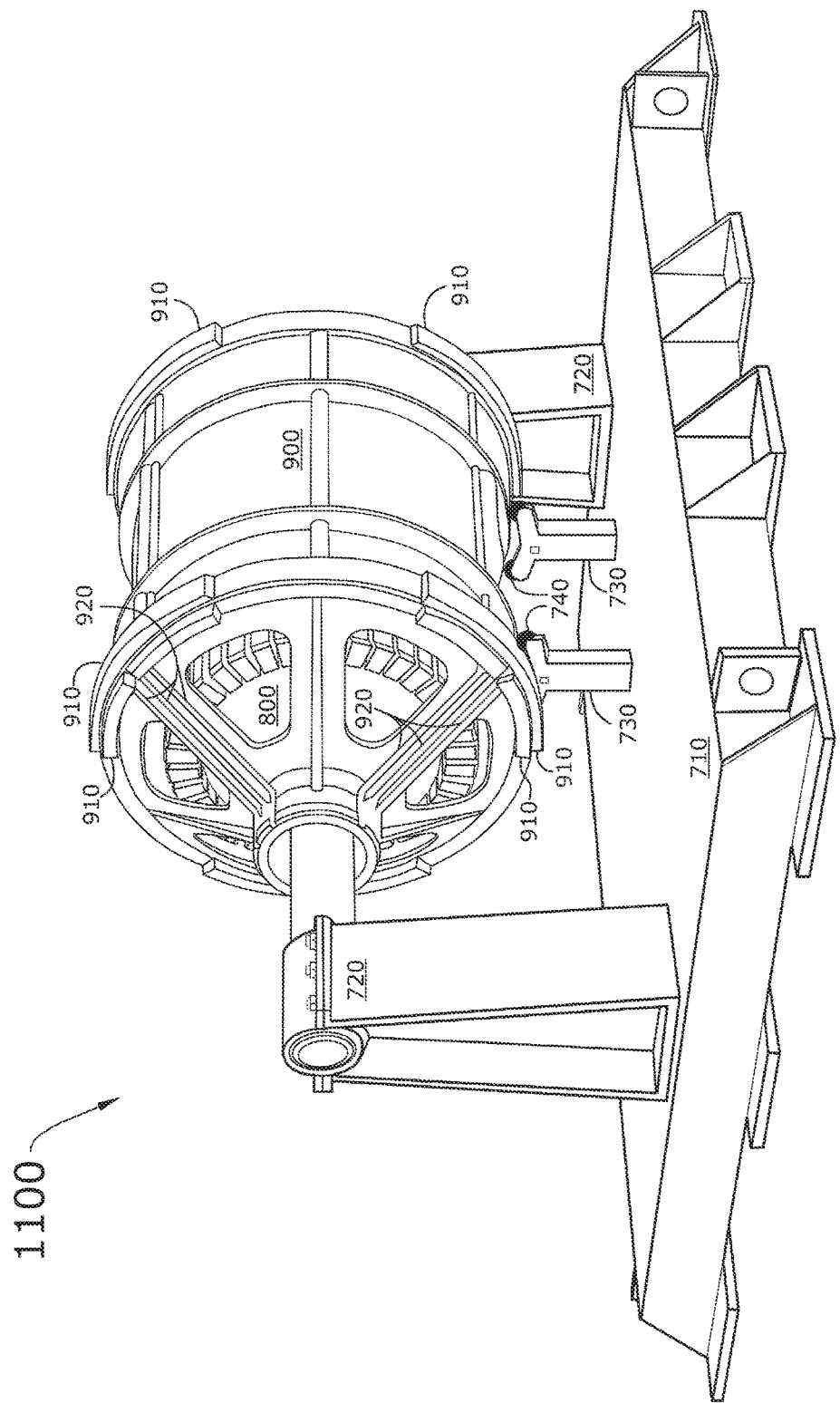

FIG. 11 conceptually illustrates a base assembly of the stator and the rotor supported by the stator and rotor supports in some embodiments.

Figure 12:
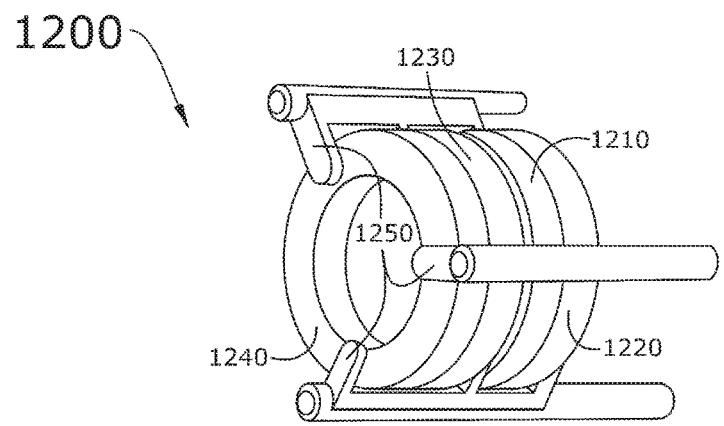

FIG. 12 conceptually illustrates a side perspective view of a slip ring assembly in some embodiments.

Figure 13:
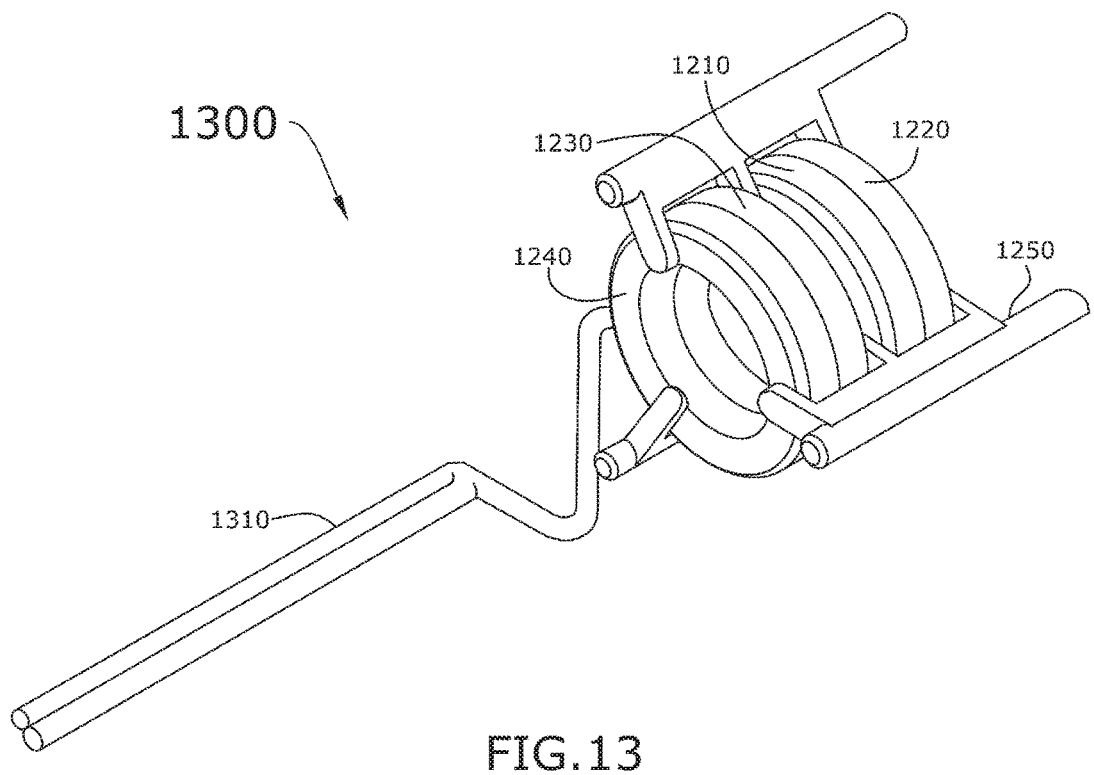

FIG. 13 conceptually illustrates a top perspective view of the slip ring assembly with PLC line in some embodiments.

Figure 14:
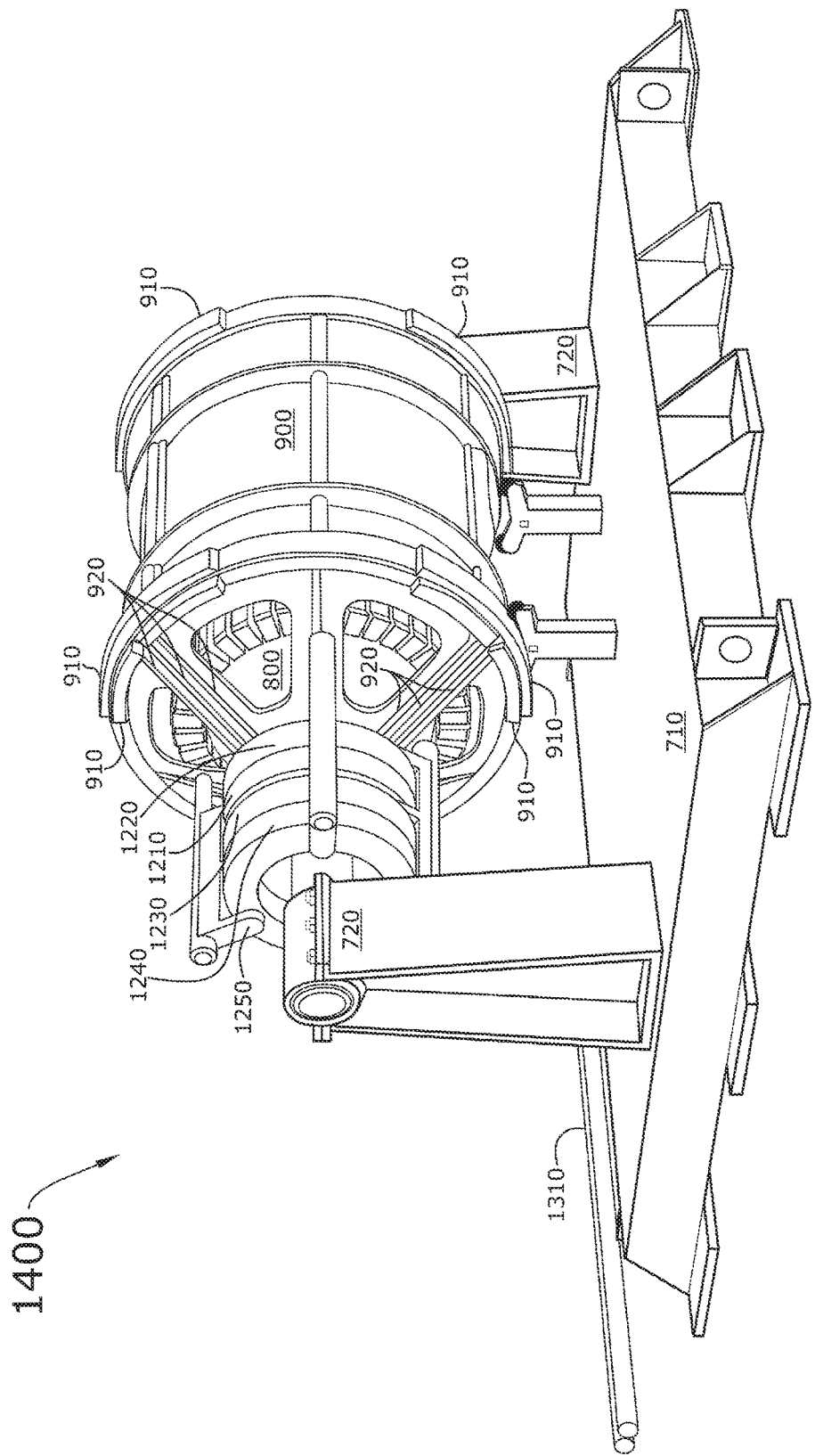

FIG. 14 conceptually illustrates the base assembly of the stator, the rotor, and the slip ring assembly with the PLC line connecting the slip ring assembly to a PLC unit in some embodiments.

FIG. 15 conceptually illustrates pulse coil shroud housings in some embodiments.

Figure 16:
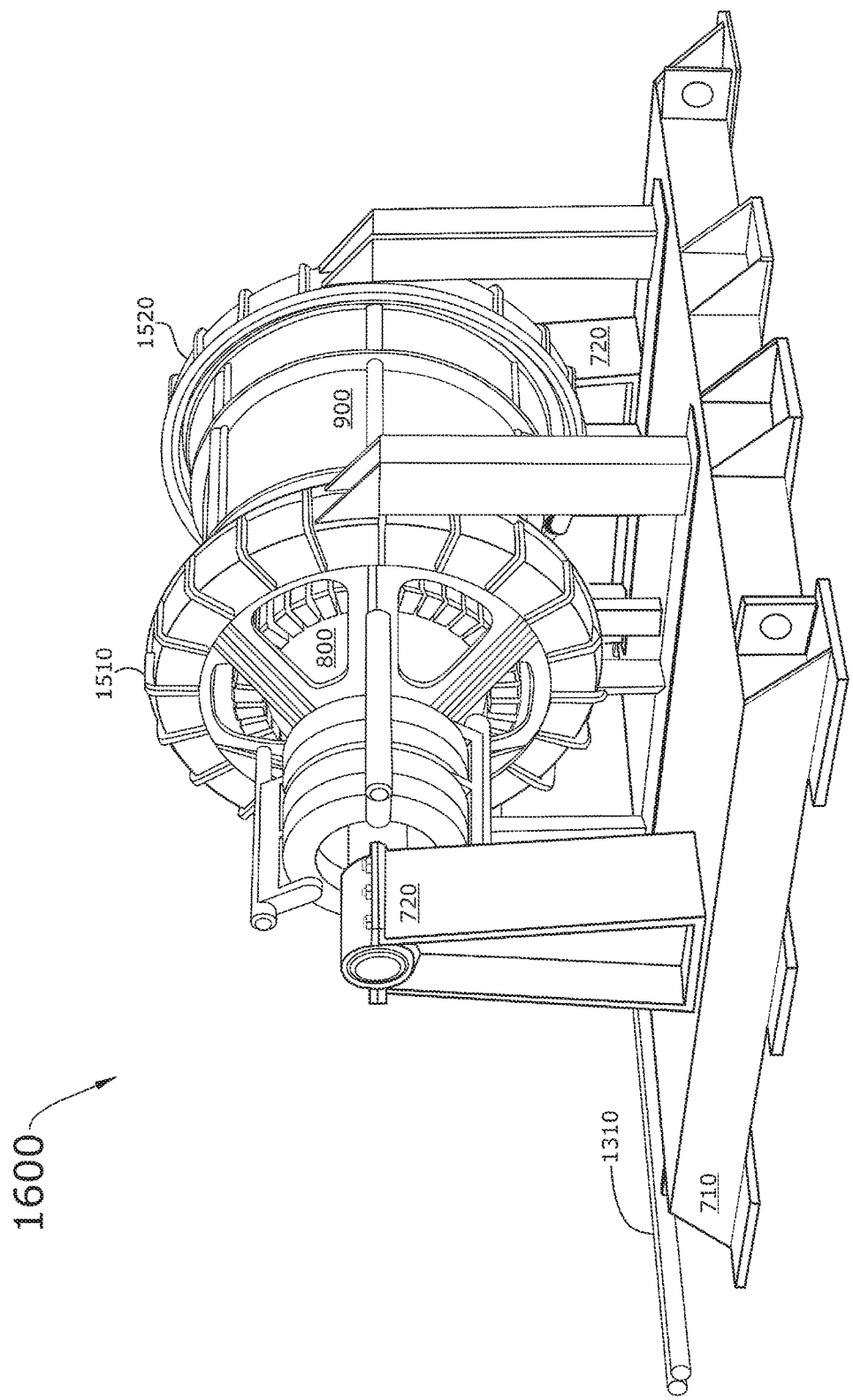

FIG. 16 conceptually illustrates the base assembly of the stator, the rotor, the slip ring assembly, and the PLC line with the pulse coil shroud housings added to the ends of the rotor in some embodiments.

FIG. 17 conceptually illustrates a section view of the self-sustained nearly frictionless and near perpetual maglev generator in some embodiments.

FIG. 18 conceptually illustrates a detailed view of the pulse coil shroud and magnets that levitate during operation of the self-sustained nearly frictionless and near perpetual maglev generator in some embodiments.

Figure 19:
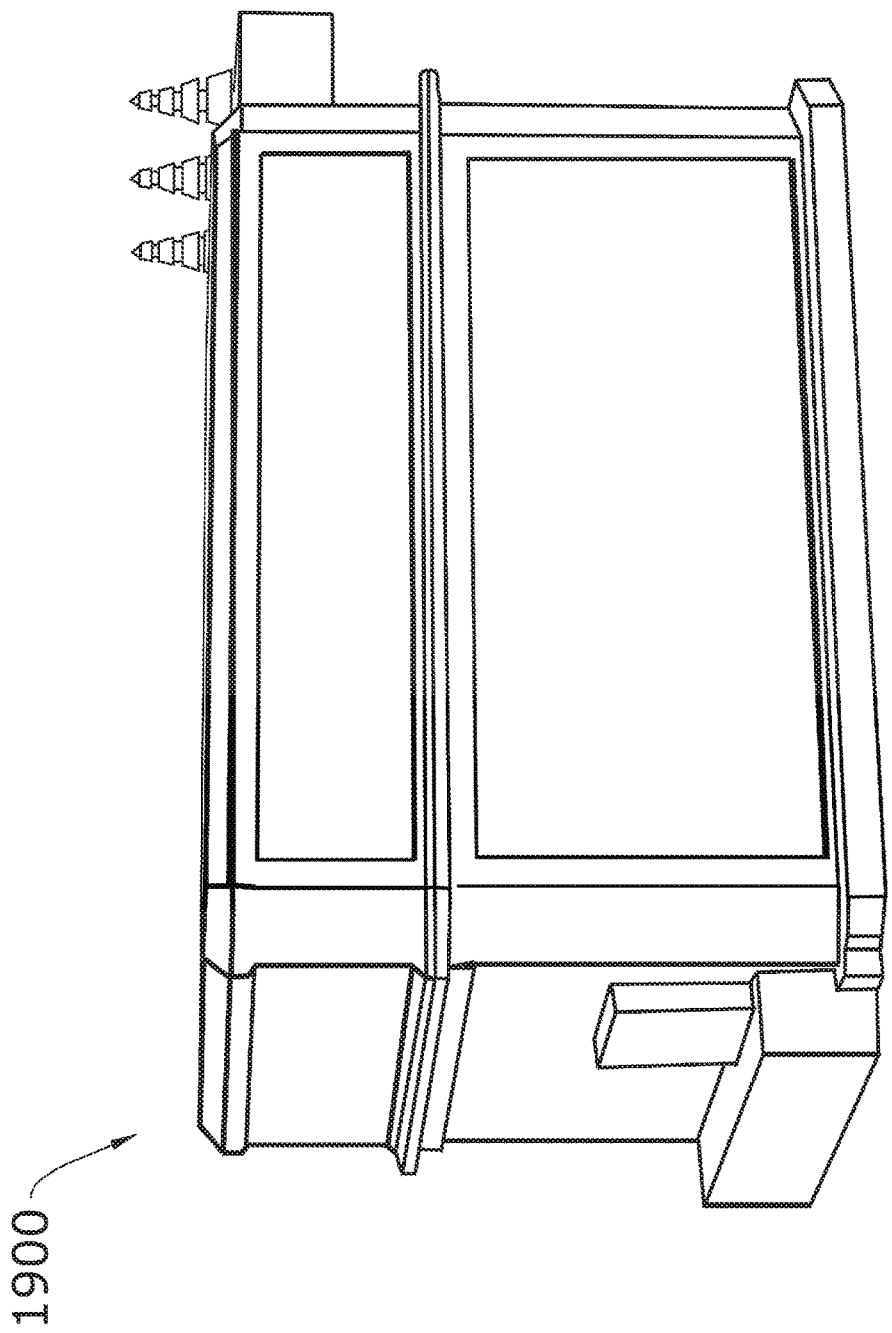

FIG. 19 conceptually illustrates a housing to cover the self-sustained nearly frictionless and near perpetual maglev generator in some embodiments.

Figure 20:
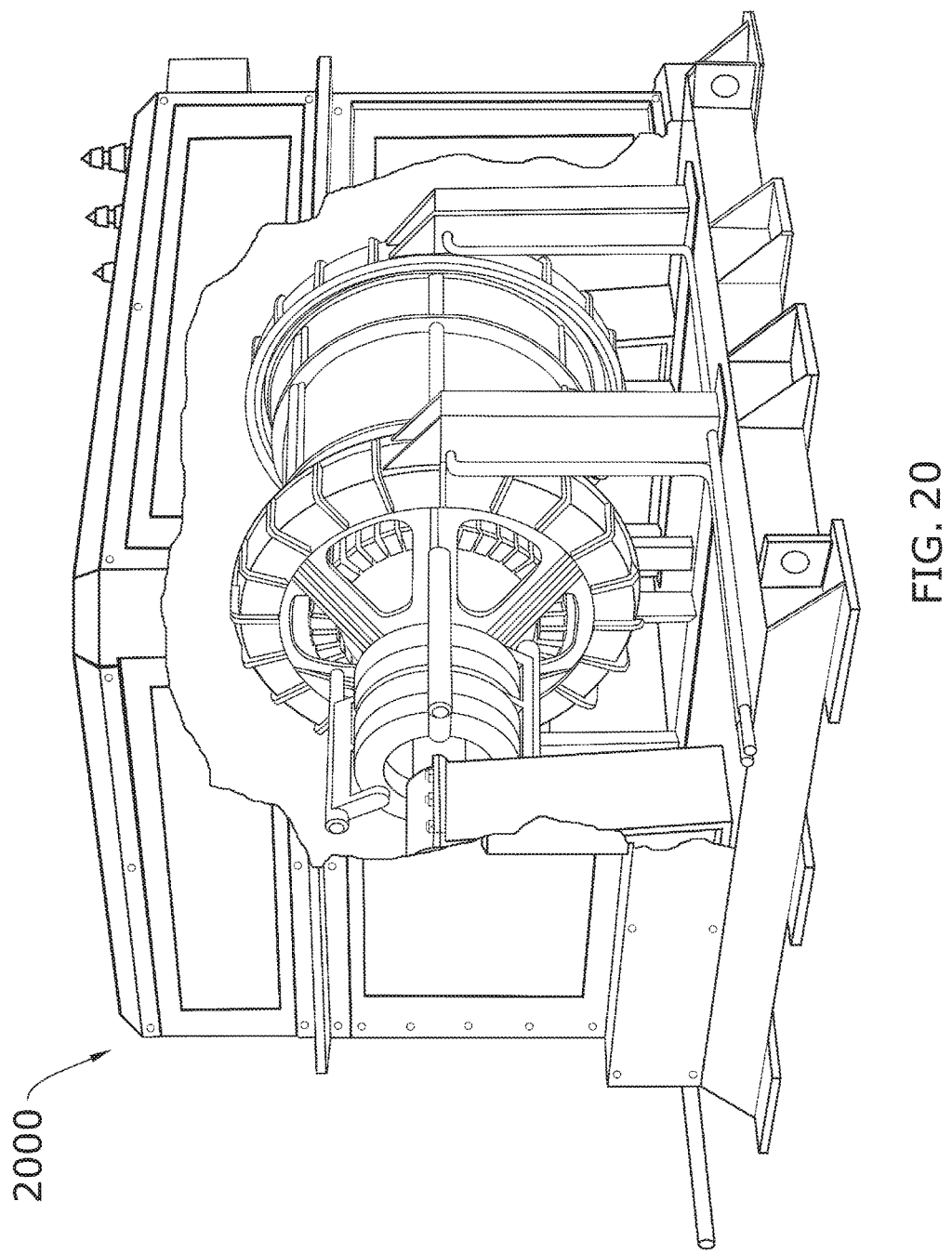

FIG. 20 conceptually illustrates the housing encapsulating the self-sustained nearly frictionless and near perpetual maglev generator in some embodiments.

Figure 21:
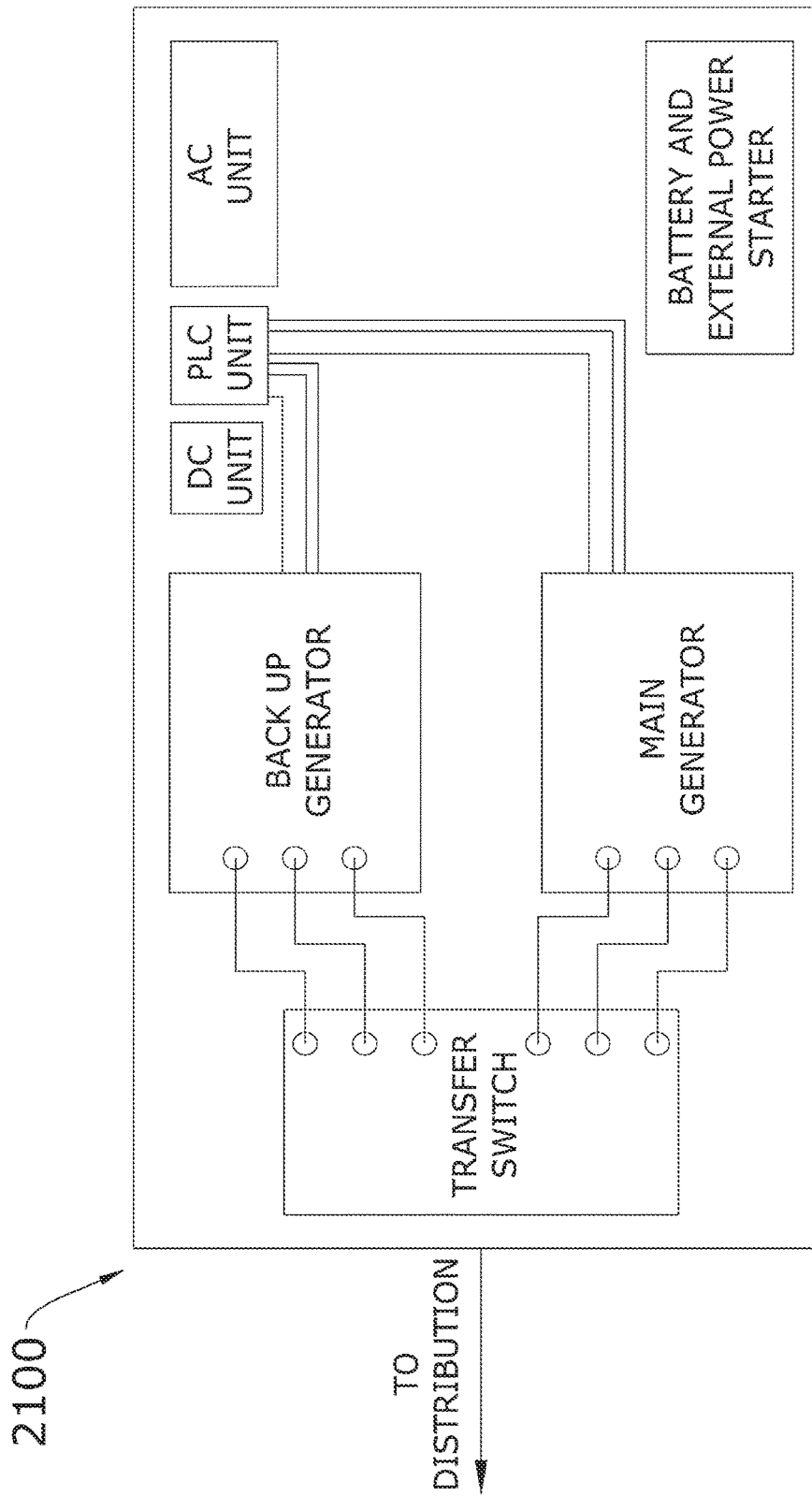

FIG. 21 conceptually illustrates the housing encapsulating the self-sustained nearly frictionless and near perpetual maglev generator in some embodiments.

Figure 22:
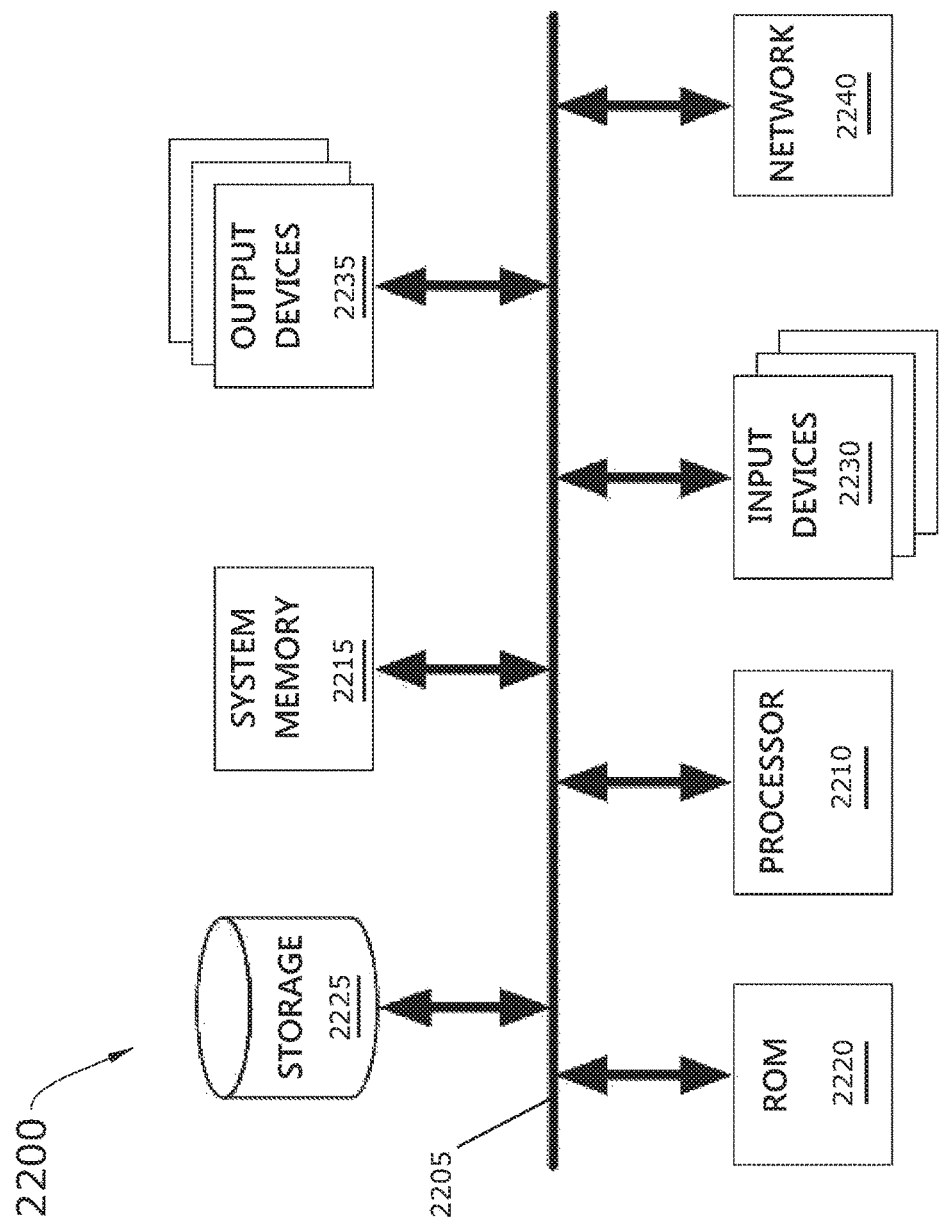

FIG. 22 conceptually illustrates an electronic programmable logic controller (PLC) system with which some embodiments of the self-sustained nearly frictionless and near perpetual maglev generator are controlled.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel method for operating a self-sustained nearly frictionless and near perpetual maglev generator started from an external power or battery source. In some embodiments, the self-sustained nearly frictionless and near perpetual maglev generator and the method for operating the self-sustained nearly frictionless and near perpetual maglev generator provides a power solution that eliminates the need of inefficient old power technologies like hydro, solar, wind, fuel, natural gas, nuclear, or any other types of electrical power generating means, and which can be utilized to power automobiles, water crafts, airplanes, space craft, weapons, and a variety of other power-needy machines. Also, the power solution of some embodiments is remote at each station, thereby avoiding vulnerability from terrorist attacks and other dangers. Furthermore, the self-sustained nearly frictionless and near perpetual maglev generator of some embodiments is remote in such a way that all automobiles, airplanes, water craft, and space ships using the power output of the self-sustained nearly frictionless and near perpetual maglev generator are self-sustained and do not require any (fossil) fuel unless for emergency backup purposes only. Moreover, all of the vehicles, aircraft, water craft, and other machines using the power from the self-sustained nearly frictionless and near perpetual maglev generator can be measured/controlled by GPS on a distance used and charged for that use accordingly on a time basis (e.g., weekly, monthly, yearly, etc.). Nuclear disaster would not be a threat because the government could use the self-sustained nearly frictionless and near perpetual maglev generator to power their apparatus instead.

As stated above, better power generating solutions are in great need because existing power technologies like hydro, solar, wind, fuel, natural gas, nuclear, or any other types of electrical generating means of power are inefficient and not feasible given current power demands (which are growing at a rapid rate) and renewable energy sources like wind (mechanical maintenance) and solar (longevity of the photovoltaic cells) are not efficient (but are getting better as the technology has evolved). All the other technologies are not self-reliant which can leave mankind vulnerable if a problem occurred with the energy we are relying on.

Embodiments of the self-sustained nearly frictionless and near perpetual maglev generator described in this specification solve such problems by eliminating the need of inefficient old power generation technologies like hydro, solar, wind, fuel, natural gas, nuclear, or any other types of electrical voltage generating mechanisms. The self-sustained nearly frictionless and near perpetual maglev generator of some embodiments can be utilized to generate electricity to power automobiles, water crafts, airplanes, space craft, and weapons, among many other types of power consuming machines. In some embodiments, the self-sustained nearly frictionless and near perpetual maglev generator is started by an external electrical energy/battery source. In some embodiments, the self-sustained nearly frictionless and near perpetual maglev generator self sustains nearly perpetually once started by the external electrical energy/battery source. Eliminating friction and mechanical energy allows the self-sustained nearly frictionless and near perpetual maglev generator to re-feed itself with a portion of the electrical energy it is generating.

By way of example, FIG. 1 conceptually illustrates a signal and current line diagram of a self-sustained nearly frictionless and near perpetual maglev generator 100. As shown in this example, the signal and current line diagram of the self-sustained nearly frictionless and near perpetual maglev generator 100 includes a starting transformer 110, a battery 120, a battery charger 130, a starting voltage regulator 140, a re-feed voltage regulator 150, a re-feed transformer 160, a programmable logic controller (PLC) system 170, and a frictionless maglev generator 180. As shown in this figure, external electric power is provided to the starting generator 110. The starting voltage regulator 140 receives current from the starting transformer 110, passing the current through a circuit that is normally closed. Optionally, the battery 120 feeds electric voltage to the circuit. The battery 120 may be charged internally by the battery charger 130. Current passes to the PLC system 170, which then provides power to start the frictionless maglev generator 180, along with programmed controls (i.e., to start the generator). As the frictionless maglev generator 180 generates power, some of the power is sent out to the power grid. For purposes of this example, the power grid can be an internal power grid of a machine or vehicle, an internal power grid of a building, or a public power grid. While some of the power ends up powering the end machinery, another portion of the generated power is re-fed back into the re-feed transformer 160, which passes power to the re-feed voltage regulator 150, and the cycle continues perpetually, without the need to use another external power source to power the frictionless maglev generator 180.

Embodiments of the self-sustained nearly frictionless and near perpetual maglev generator described in this specification differ from and improve upon currently existing options. In particular, the self-sustained nearly frictionless and near perpetual maglev generator is self-sustaining from its own energy once started from an external power/battery source. Where all other types of generators are reliant on other energies to not only start them, but also to continually operate them, the self-sustained nearly frictionless and near perpetual maglev generator described in this disclosure is frictionless and eliminates mechanical energy, allowing for generated energy to be fed back into the self-sustained nearly frictionless and near perpetual maglev generator to maintain its operation. Furthermore, all other generators utilize mechanical energy to generate power with the exception of solar power generation. However, solar is reliant on the energy of the sun, which is not always clearly available.

In addition, the self-sustained nearly frictionless and near perpetual maglev generator improves upon the currently existing options by using distributing stations and transmission lines. In contrast, automobiles, watercraft, airplanes, and space ships are reliant on fuel in which the fuel tanks are limited to storage space so they can only travel so far. The military utilizes nuclear for electric power for some of their apparatus which is very dangerous, cannot be contained, and kills life once exposed and, therefore, makes us all vulnerable. However, the self-sustained nearly frictionless and near perpetual maglev generator generates and distributes clean and safe electricity.

In some embodiments, the self-sustained nearly frictionless and near perpetual maglev generator provides power that can be remote at each station avoiding vulnerability from terrorist attacks. All automobiles, airplanes, watercraft, and space ships would be self-sustained and not require any fuel unless for emergency backup purposes only. They all can be measured/controlled by GPS on a distance used and charged for that use accordingly on a monthly basis. Also, electricity can be used to create the composition of water by splitting the hydrogen molecule to two molecules. It can also be used to desalinate salt water because the power is at a cheaper kWh cost creating more feasibility. It can also create the energy for an automobile maglev system eliminating wheels, tires, and the complete concept of automobile travel today. It would be much faster and efficient way of automobile travel today.

The self-sustained nearly frictionless and near perpetual maglev generator and method of operating of the present disclosure may be comprised of the following elements. This list of possible constituent elements is intended to be exemplary only and it is not intended that this list be used to limit the self-sustained nearly frictionless and near perpetual maglev generator and method of operating of the present application to just these elements. Persons having ordinary skill in the art relevant to the present disclosure may understand there to be equivalent elements that may be substituted within the present disclosure without changing the essential function or operation of the self-sustained nearly frictionless and near perpetual maglev generator and method of operating.

1. Stationary electromotive force (EMF) coils
2. Stationary maglev driven coil electromagnets
3. Magnetically levitated super-coiled electromagnet
4. Enclosure
5. PLC system
6. External electric power starter unit The various elements of the self-sustained nearly frictionless and near perpetual maglev generator and method of operating of the present disclosure may be related in the following exemplary fashion. It is not intended to limit the scope or nature of the relationships between the various elements and the following examples are presented as illustrative examples only. The external electric power starter unit starts the self-sustained nearly frictionless and near perpetual maglev generator for new generation of power by energizing the stationary maglev driven coil electromagnet, the PLC system, and the magnetically levitated super-coiled electromagnet. Once energized, the magnetically levitated super-coiled electromagnet is floating frictionless in a magnetic field ready to be rotated. The PLC system starts and controls the magnetically levitated super-coiled electromagnet's rotating velocity. The magnetically levitated super-coiled electromagnet energizes the stationery EMF coils and the stationery EMF coils energizes the stationery maglev driven coil electromagnets, the magnetically levitated super-coiled electromagnet, and the PLC system, and, by disconnecting the external electric power starter unit, it is now self-sustained perpetually.

By way of example, FIG. 2 conceptually illustrates an example of a self-sustained nearly frictionless and near perpetual maglev generator 200. As shown in this figure, the self-sustained nearly frictionless and near perpetual maglev generator 200 includes stationary EMF coils 10, top and bottom stationery maglev driven coil electromagnets 12, side stationery maglev driven coil electromagnets 14, vertical mounts 16, horizontal mounts 18, a magnetically levitated super-coiled electromagnet 20, and an enclosure 22.

Now turning to FIG. 3, which conceptually illustrates an example of an operating self-sustained nearly frictionless and near perpetual maglev generator 300 without the enclosure and the stationary EMF coils for clarity. As shown in this example, the self-sustained nearly frictionless and near perpetual maglev generator 300 is in operation by the spin 24 of the magnetically levitated super-coiled electromagnet 20.

Rounding out these examples, FIG. 4 conceptually illustrates a section view of the self-sustained nearly frictionless and near perpetual maglev generator 200 taken along 4-4 in FIG. 2. Similarly, FIG. 5 conceptually illustrates a section view of the self-sustained nearly frictionless and near perpetual maglev generator 200 taken along 5-5 in FIG. 2.

The self-sustained nearly frictionless and near perpetual maglev generator utilizes an amount of electrical energy from the external electric power starter unit to energize the stationary maglev driven coil electromagnets, the magnetically levitated super-coiled electromagnet, and the PLC system. The EMF produced from the stationary EMF coils is proportionally sized based on the stationary maglev driven coil electromagnets', the magnetically levitated super-coiled electromagnet's, the enclosure's, the PLC system's, and the external electric power starter unit's logic of operation. Finishing with a transformation of voltage from the stationery EMF coils to re-feed the stationery maglev driven coil electromagnets, the magnetically levitated super-coiled electromagnet, the enclosure, the PLC system, and the external electric power starter unit perpetually self-sustaining. Now, by creating a constant positive electrical energy from the stationery EMF coils.

To make the self-sustained nearly frictionless and near perpetual maglev generator of the present disclosure, the stationery EMF coils, the magnetically levitated super-coiled electromagnet, the enclosure, and the external electric power starter unit can be manufactured from any generator manufacturer, while the stationery maglev driven coil electromagnets, the magnetically levitated super-coiled electromagnet, and the PLC system can be manufactured from a maglev manufacturer (e.g., Siemens, NASA Sky Tran at the Ames Research Center, etc.). The frequency control portion of the PLC system of the self-sustained nearly frictionless and near perpetual maglev generator can also be manufactured from by a commercial enterprise (e.g., One Cycle Controls). The external electric power starter unit is optional depending on whether the self-sustained nearly frictionless and near perpetual maglev generator utilizes a battery or another external electrical energy source to start it. The enclosure has the option to be set as a vacuumed enclosure to eliminate any air friction and extreme weather elements creating more efficiency, if desired.

The self-sustained nearly frictionless and near perpetual maglev generator can work better by using components that weigh less. As electromagnetic strength technology becomes better it will make the self-sustained nearly frictionless and near perpetual maglev generator more efficient.

The stationery EMF coils can be interchanged with the magnetically levitated super-coiled electromagnet in the design of the self-sustained nearly frictionless and near perpetual maglev generator to accomplish the same function. Per EMF the magnet or the coil can be rotated to generate an EMF.

The positioning of the stationery EMF coils, the stationery maglev driven coil electromagnets, the magnetically levitated super-coiled electromagnet, the enclosure, the PLC system, and the external electric power starter unit can be made in a horizontal position or a vertical position can accomplish the same function. Also, utilizing a different maglev technology instead of the stationery maglev driven coil electromagnets and/or the magnetically levitated super-coiled electromagnet can accomplish the same function.

In some embodiments, the method for operating the self-sustained nearly frictionless and near perpetual maglev generator includes a plurality of steps to generate power in an efficient and self-sustaining manner. In some embodiments, the plurality of steps of the method for operating the self-sustained nearly frictionless and near perpetual maglev generator include (i) generating the electromotive force (EMF) by the stationery EMF coils and using a portion of the generated EMF to re-feed the self-sustained nearly frictionless and near perpetual maglev generator to keep it going, (ii) controlling the magnetically levitated super-coiled electromagnet by the stationery maglev driven coil electromagnets, (iii) cutting the stationery EMF coils with lines of magnetic flux from the novel and unique super magnet design of the magnetically levitated super-coiled electromagnet, (iv) housing and positioning the self-sustained nearly frictionless and near perpetual maglev generator by the enclosure based on the proportional size of the EMF produced and a positioning on Earth's surface which makes it parallel with Earth's magnetic field, (v) controlling the velocity by which the magnetically levitated super-coiled electromagnet cuts the stationery EMF coils by the programmable logic controller (PLC) controlling the magnetic strength of the stationery maglev driven coil electromagnets (the greater the magnetic strength, the greater the velocity creating more EMF), thereby controlling the voltage and frequency of the self-sustained nearly frictionless and near perpetual maglev generator, and (vi) starting the self-sustained nearly frictionless and near perpetual maglev generator by the external electric power starter unit and disconnecting after the self-sustained nearly frictionless and near perpetual maglev generator is started and is generating enough energy to self-sustain perpetually (and recharging the external electric power starter unit from a transformation of the stationary EMF coils if used from an external battery source).

To use the method of the present disclosure, a person would use electricity the same way they use it today but would receive a cheaper cost for the use. The utility companies would receive a cheaper kwh cost that can be reasonably passed on to the consumer. The government can measure peoples automobiles by GPS based on the distance driven equal to two dollars per gallon billed on a monthly basis. The same can be done for watercraft, airplanes, spacecraft, and weapons.

While the examples described above by reference to FIGS. 2-5 provide an overview of the self-sustained nearly frictionless and near perpetual maglev generator and the method for operating the self-sustained nearly frictionless and near perpetual maglev generator, other manners of operation are possible. For example, the stationery EMF coils could be interchanged with the magnetically levitated super-coiled electromagnet to accomplish the same method. Furthermore, to date there are four different maglev technologies know to be able to be utilized in a different design of the self-sustained nearly frictionless and near perpetual maglev generator to accomplish the same method for operation. Three of the four maglev technologies are presently public information. Thus, a person skilled in the relevant art would appreciate that a different design of the self-sustained nearly frictionless and near perpetual maglev generator or different components and/or different positioning of any of the above components or elements of the self-sustained nearly frictionless and near perpetual maglev generator or the method for operating can be changed to accomplish the same or nearly the same results.

At least one embodiment of the self-sustained nearly frictionless and near perpetual maglev generator includes several additional components which are described in the sections below. Specifically, Section I generally describes a self-sustained nearly frictionless and near perpetual maglev generator. Section II describes some of the central components of the self-sustained nearly frictionless and near perpetual maglev generator. Section III describes a slip ring assembly and PLC controls to rotate components of the self-sustained nearly frictionless and near perpetual maglev generator. Section IV describes how stationary EMF pulse coils are used during operation of the self-sustained nearly frictionless and near perpetual maglev generator. Section V describes an enclosure that encompasses the self-sustained nearly frictionless and near perpetual maglev generator, as well as providing a brief description of a frictionless maglev generator control room. Section VI describes an electronic programmable logic controller (PLC) system with which some embodiments of the self-sustained nearly frictionless and near perpetual maglev generator are controlled.

I. Frictionless Maglev Generator

An example of another self-sustained nearly frictionless and near perpetual maglev generator is described next, by reference to FIGS. 6-21. First, by way of example, FIG. 6 conceptually illustrates a self-sustained nearly frictionless and near perpetual maglev generator 600. The self-sustained nearly frictionless and near perpetual maglev generator 600 shown in this figure includes several components, including, without limitation, a base platform with rotor supports and stator supports, a rotor, a stationary stator around which the rotor revolves, a pair of pulse coil shrouds, and a slip ringer assembly. These and other components of the self-sustained nearly frictionless and near perpetual maglev generator 600 are described below by reference to FIGS. 7-21.

II. Central Components of Frictionless Maglev Generator

By way of example, FIG. 7 conceptually illustrates a base support platform 700 for the self-sustained nearly frictionless and near perpetual maglev generator 600. As shown in this figure, the base support platform 700 includes a base 710, a pair of stator supports 720 mounted to the base 710, and a pair of rotor supports 730 mounted to the base 710. The pair of stator supports 720 allow a normal stationary type generator stator to be mounted to the base 710. Each rotor support 730 includes a pair of caster wheels 740 that allow a rotor to revolve around the stationary generator stator at the center of the self-sustained nearly frictionless and near perpetual maglev generator 600. In some embodiments, the rotor supports 730 are hydraulically operated and are retracted down once a rotor is activated.

By way of example, FIG. 8 conceptually illustrates an example of such a stator 800 which is at the center of the self-sustained nearly frictionless and near perpetual maglev generator 600. The stator 800 is rigidly mounted at each end to the base 710 using the stand-off stator supports 720.

Now turning to FIG. 9, a rotor 900 is conceptually illustrated. The rotor 900 includes several levitating electromagnets 910 and connections 920 for several of the levitating electromagnets 910. The rotor 900 is mounted over the stator, resting on the caster wheels 740 of the rotor supports 730.

Now turning to an inner view of the rotor 900, FIG. 10 conceptually illustrates the inside of the rotor 1000 with a plurality of main generator magnets 1010 mounted to an inner surface of the inside of the rotor 1000.

Putting together the components described by reference to FIGS. 6-10 of the self-sustained nearly frictionless and near perpetual maglev generator 600, FIG. 11 conceptually illustrates a partially assembled self-sustained nearly frictionless and near perpetual maglev generator 1100. As shown assembled in this figure, the stationary generator stator 800 is rigidly supported to the base 710 by the stator supports 720 with the rotor 900 mounted over the stator 800 and positioned to rest on the caster wheels 740 of the rotor supports 730, thereby allowing the rotor 900 to revolve around the stationary stator 800 when activated. In some embodiments, the rotor supports 730 (and caster wheels 740) are hydraulically retracted toward the base 710 when the rotor 900 is activated. Also, the levitating electromagnets 910 are shown surrounding edge surfaces of the rotor 900 (and their respective connections 920). While not visible in this figure, several inner main generator magnets 1010, described above by reference to FIG. 10, are mounted to the inner surface of the inside of the rotor and face the stator 800.

III. Slip Ring Assembly and PLC Line

Detailing another component of the self-sustained nearly frictionless and near perpetual maglev generator 600, FIG. 12 conceptually illustrates a side perspective view of a slip ring assembly 1200. The slip ring assembly 1200 includes a plurality of slip rings comprising an active stator slip ring 1210 that is locked to the stator, an active rotor slip ring 1220 that is locked to the rotor by way of the rotor slip ring harness 1250, a backup stator slip ring 1230, and a backup rotor slip ring 1240.

In some embodiments, programmable logic controller (PLC) system control lines (or "PLC control lines") are connected to the slip ring assembly 1200 to allow input/output control of the self-sustained nearly frictionless and near perpetual maglev generator 600. An example of this is shown in FIG. 13, which conceptually illustrates a top perspective view of PLC controllable slip ring assembly 1300. Specifically, in addition to the rotor slip ring harness 1250, the active stator slip ring 1210 and rotor slip ring 1220, and the backup stator slip ring 1230 and rotor slip ring 1240, the PLC slip ring assembly 1300 as shown in this figure includes PLC line 1310.

Furthermore, FIG. 14 conceptually illustrates the base assembly of the stator, the rotor, the slip ring assembly, and the PLC line 1500, with the PLC line connecting the slip ring assembly to a PLC unit in some embodiments.

IV. Stationary EMF Pulse Coils

By way of example, FIG. 15 conceptually illustrates EMF pulse coils and pulse coil shrouds 1500. As shown in this figure, the pulse coil shrouds include a front pulse coil shroud 1510, a rear pulse coil shroud 1520, and EMF pulse coils 1530. In some embodiments, the front and rear pulse coil shrouds 1510 and 1520 are mounted to the base of the self-sustained nearly frictionless and near perpetual maglev generator 600. In some embodiments, the front pulse coil shroud 1510 surrounds the front end of the rotor and the rear pulse coil shroud 1520 surrounds the back end of the rotor. In some embodiments, radial clearances between the pulse coil shrouds 1510 and 1520 and the levitating electromagnets of the rotor need to be specified clearances. The front and rear pulse coil shrouds 1510 and 1520 are shown surrounding the front and back ends of the rotor 900 in the self-sustained nearly frictionless and near perpetual maglev generator 1600 conceptually illustrated in FIG. 16.

A more detailed view of the pulse coils 1530, the front and the rear pulse coil shrouds 1510 and 1520, the slip ring assembly 1210-1250, the rotor 900, levitating magnets 910, and the stator 800 are shown as an assembly of a self-sustained nearly frictionless and near perpetual maglev generator 1700 mounted to a base 710 that includes mountable stator mounts 720 and rotor mounts 730 with caster wheel 730 in FIG. 17. When the self-sustained nearly frictionless and near perpetual maglev generator 1700 is in use, the levitating magnets 910 are activated and will then levitate the rotor 900 radially, and end to end, inside the pulse coil shrouds 1510 and 1520, thereby capturing it in the magnetic field. This occurs because the electromagnetic pulse coils 1530, when activated, produce electromagnetic waves to spin the rotor 900, thereby providing nearly frictionless motion of the rotor 900. This is shown by arrows in FIG. 18, which conceptually illustrates a detailed view of the front and rear pulse coil shrouds 1510 and 1520, EMF pulse coils 1530, and levitating magnets 910 that levitate (shown by arrows encircles in dashed circles 1810) during operation of the self-sustained nearly frictionless and near perpetual maglev generator.

V. Frictionless Maglev Generator Enclosure and Control Room

By way of example, FIG. 19 conceptually illustrates an enclosure 1900 to cover the self-sustained nearly frictionless and near perpetual maglev generator. The enclosure 1900 surrounds the entire self-sustained nearly frictionless and near perpetual maglev generator, with antennas to allow for power distribution. In another example of the enclosure, FIG. 20 conceptually illustrates a more detailed, cut-out view of an enclosure housing 2000 encapsulating the self-sustained nearly frictionless and near perpetual maglev generator, with all wired connections installed. Also, another example of a self-sustained nearly frictionless and near perpetual maglev generator control room 2100 is conceptually illustrated in FIG. 21.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

VI. Electronic Programmable Logic Controller (PLC) System

Many of the above-described features and applications are implemented as software processes or control programs that are specified as a set of instructions recorded on a computer readable storage medium (also referred to as computer readable medium or machine readable medium). When these instructions are executed by one or more processing unit(s)

(e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 22 conceptually illustrates an electronic PLC system 2200 with which some embodiments of the invention are implemented. The electronic PLC system 2200 may be a computer, phone, PDA, or any other sort of electronic device. Such an electronic system includes various types of computer readable media and interfaces for various other types of computer readable media. Electronic PLC system 2200 includes a bus 2205, processing unit(s) 2210, a system memory 2215, a read-only 2220, a permanent storage device 2225, input devices 2230, output devices 2235, and a network 2240.

The bus 2205 collectively represents all system, peripheral, and chipset buses that communicatively connect the numerous internal devices of the electronic PLC system 2200. For instance, the bus 2205 communicatively connects the processing unit(s) 2210 with the read-only 2220, the system memory 2215, and the permanent storage device 2225.

From these various memory units, the processing unit(s) 2210 retrieves instructions to execute and data to process in order to execute the processes of the invention. The processing unit(s) may be a single processor or a multi-core processor in different embodiments.

The read-only-memory (ROM) 2220 stores static data and instructions that are needed by the processing unit(s) 2210 and other modules of the electronic system. The permanent storage device 2225, on the other hand, is a read-and-write memory device. This device is a non-volatile memory unit that stores instructions and data even when the electronic PLC system 2200 is off. Some embodiments of the invention use a mass-storage device (such as a magnetic or optical disk and its corresponding disk drive) as the permanent storage device 2225.

Other embodiments use a removable storage device (such as a floppy disk or a flash drive) as the permanent storage device 2225. Like the permanent storage device 2225, the system memory 2215 is a read-and-write memory device. However, unlike storage device 2225, the system memory 2215 is a volatile read-and-write memory, such as a random access memory. The system memory 2215 stores some of the instructions and data that the processor needs at runtime. In some embodiments, the invention's processes are stored in the system memory 2215, the permanent storage device 2225, and/or the read-only 2220. For example, the various memory units include instructions for processing appearance alterations of displayable characters in accordance with some embodiments. From these various memory units, the processing unit(s) 2210 retrieves instructions to execute and data to process in order to execute the processes of some embodiments.

The bus 2205 also connects to the input and output devices 2230 and 2235. The input devices enable the user to communicate information and select commands to the electronic system. The input devices 2230 include alphanumeric keyboards and pointing devices (also called "cursor control devices"). The output devices 2235 display images generated by the electronic PLC system 2200. The output devices 2235 include printers and display devices, such as cathode ray tubes (CRT) or liquid crystal displays (LCD). Some embodiments include devices such as a touchscreen that functions as both input and output devices.

Finally, as shown in FIG. 22, bus 2205 also couples electronic PLC system 2200 to a network 2240 through a network adapter (not shown). In this manner, the computer can be a part of a network of computers (such as a local area network ("LAN"), a wide area network ("WAN"), or an intranet), or a network of networks (such as the Internet). Any or all components of electronic PLC system 2200 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

The above-described embodiments of the invention are presented for purposes of illustration and not of limitation. While these embodiments of the invention have been described with reference to numerous specific electricity generating components and digital computer programmable logic controller (PLC) systems, one of ordinary skill in the art will recognize that the invention can be embodied in other specific forms without departing from the spirit of the invention, and that such other embodiments can be implemented as conventional software applications that run on processors of PLC computing devices. Thus, one of ordinary skill in the art would understand that the invention is not to be limited by the foregoing illustrative details, but rather is to be defined by the appended claims.

I claim:

1. A method for operating a self-sustained nearly frictionless and near perpetual maglev generator started from an external power or battery source, said method comprising:
   using stationery electromotive force coils (stationery EMF coils) to generate an electromotive force and using a portion of the electromotive force to feed a generator to maintain powered operation of a self-sustained frictionless maglev generator;
   using stationery driven electromagnets to control a magnetically levitated super-coiled electromagnet;
   setting a location of and positioning an enclosure to house the self-sustained frictionless maglev generator, wherein the location is based on a proportional size of the electromotive force produced and a position of the self-sustained frictionless maglev generator on Earth's surface that is parallel with a magnetic field of Earth;
   using a programmable logic controller (PLC) system to control velocity of the magnetically levitated super-coiled electromagnet and cutting the stationery EMF coils which controls voltage and frequency of the generator, wherein strength of the stationery driven electromagnets is controlled such that greater magnetic strength generates greater velocity and creates a greater electromotive force; and
   using an external electric power starter unit to start the generator.

2. The method of claim 1, further comprising cutting the stationery EMF coils with lines of magnetic flux from the magnetically levitated super-coiled electromagnet.

3. The method of claim 1, further comprising disconnecting from the external electric power starter unit after the generator is started and is generating enough energy to self-sustain perpetually.

4. The method of claim 1, further comprising recharging the external electric power starter unit from a transformation of the stationary EMF coils when used from an external battery source.

5. A self-sustained nearly frictionless and near perpetual maglev generator comprising:
   a stationary generator stator;
   a rotor that surrounds the stationary generator stator;
   a base on which to mount components;
   a pair of stator supports mounted to the base to allow the stationary generator stator to be mounted to the base;
   a pair of rotor supports mounted to the base, wherein each rotor support includes a pair of caster wheels on which the rotor rests to allow the rotor to revolve around the stator;
   stationery electromotive force coils (stationery EMF coils) to generate an electromotive force (EMF);
   a plurality of stationery maglev driven coil electromagnets disposed around an inner surface of the rotor;
   a plurality of magnetically levitated super-coiled electromagnets disposed around an external surface of the rotor;
   an enclosure that is positioned over the base;
   a programmable logic (PLC) system; and
   an external electric power starter unit.

6. The self-sustained nearly frictionless and near perpetual maglev generator of claim 5, wherein the pair of rotor supports are hydraulically operated and are retracted down once a rotor is activated.

7. The self-sustained nearly frictionless and near perpetual maglev generator of claim 5, wherein the enclosure fully encapsulates the pair of stator supports, the pair of rotor supports, the pair of caster wheels, the stationary generator stator, the rotor, the plurality of stationery maglev driven coil electromagnets, the plurality of magnetically levitated super-coiled electromagnets, the stationery EMF coils, and a plurality of based-mounted pulse coil shrouds comprising a first pulse coil shroud that surrounds a front end of the rotor and a second pulse coil shroud that surrounds a back end of the rotor.

8. The self-sustained nearly frictionless and near perpetual maglev generator of claim 5 further comprising a slip ring assembly comprising an active stator slip ring that is locked to the stationary generator stator, a backup stator slip ring, a rotor slip ring harness, an active rotor slip ring that is locked to the rotor by way of the rotor slip ring harness, a backup rotor slip ring, and a set of programmable logic controller lines (PLC control lines) that are connected to the PLC system to allow incoming and outgoing operational control via the PLC system.

9. The self-sustained nearly frictionless and near perpetual maglev generator of claim 5 further comprising a backup generator.

10. The self-sustained nearly frictionless and near perpetual maglev generator of claim 7, wherein the stationery EMF coils are lined around inner surfaces of the plurality of based-mounted pulse coil shrouds.

\* \* \* \* \*